United States Patent
Shivadas et al.

(10) Patent No.: US 9,354,799 B2
(45) Date of Patent: May 31, 2016

(54) SYSTEMS AND METHODS FOR ADAPTIVE STREAMING SYSTEMS WITH INTERACTIVE VIDEO TIMELINES

(75) Inventors: Abhishek Shivadas, San Diego, CA (US); Kourosh Soroushian, San Diego, CA (US)

(73) Assignee: SONIC IP, INC., San Diego, CA (US)

(*) Notice: Subject to any disclaimer, the term of this patent is extended or adjusted under 35 U.S.C. 154(b) by 313 days.

(21) Appl. No.: 13/495,757

(22) Filed: Jun. 13, 2012

(65) Prior Publication Data

US 2013/0339855 A1 Dec. 19, 2013

(51) Int. Cl.
| | |
|---|---|
| G06F 3/00 | (2006.01) |
| G06F 3/0485 | (2013.01) |
| G06F 3/0484 | (2013.01) |
| G06F 3/01 | (2006.01) |
| H04N 21/472 | (2011.01) |
| H04N 21/845 | (2011.01) |
| H04N 21/8545 | (2011.01) |

(52) U.S. Cl.
CPC .......... *G06F 3/0485* (2013.01); *G06F 3/04842* (2013.01); *G06F 2203/04803* (2013.01); *H04N 21/47217* (2013.01); *H04N 21/845* (2013.01); *H04N 21/8545* (2013.01)

(58) Field of Classification Search
CPC ..... G06F 3/011; G06F 3/0482; G06F 3/1446; G06F 17/3087
USPC .................................................. 715/720–723
See application file for complete search history.

(56) References Cited

U.S. PATENT DOCUMENTS

| | | | | |
|---|---|---|---|---|
| 6,069,606 | A * | 5/2000 | Sciammarella et al. | 345/660 |
| 6,807,361 | B1 * | 10/2004 | Girgensohn et al. | 386/227 |
| 7,194,527 | B2 * | 3/2007 | Drucker et al. | 709/220 |
| 7,246,322 | B2 * | 7/2007 | Neely et al. | 715/747 |
| 7,437,005 | B2 * | 10/2008 | Drucker et al. | 382/224 |
| 7,559,039 | B2 * | 7/2009 | Ridgley et al. | 715/854 |
| 7,689,525 | B2 * | 3/2010 | Drucker et al. | 706/45 |
| 7,769,832 | B2 * | 8/2010 | Drucker et al. | 709/220 |
| 7,877,707 | B2 * | 1/2011 | Westerman et al. | 715/863 |
| 7,956,848 | B2 * | 6/2011 | Chaudhri | 345/173 |
| 2003/0030595 | A1* | 2/2003 | Radley-Smith | 345/1.3 |
| 2004/0076444 | A1* | 4/2004 | Badovinac et al. | 399/81 |

(Continued)

OTHER PUBLICATIONS

International Search Report and Written Opinion for International Application No. PCT/US2013/043176, International Filing Date May 29, 2013, Search Completed Nov. 25, 2013, Mailed Dec. 12, 2013, 12 pgs.

(Continued)

*Primary Examiner* — Nicholas Augustine
(74) *Attorney, Agent, or Firm* — KPPB LLP (57) ABSTRACT

Systems and methods for adaptive streaming systems configured to generate interactive video timelines in accordance with embodiments of the invention are disclosed. In one embodiment of the invention, a method for selecting video to stream and playback using an interactive video timeline includes selecting a plurality of frames of video from a first stream of video data using a network client, displaying the plurality of frames of video in an interactive video timeline using the network client, selecting a playback frame of video data from the plurality of frames of video in the interactive video timeline using the network client, receiving a second stream of video data beginning from the playback frame of video data using the network client, and playing the second stream of video data using the network client.

16 Claims, 6 Drawing Sheets

(56) References Cited

U.S. PATENT DOCUMENTS

| | | |
|---|---|---|
| 2005/0039140 A1* | 2/2005 | Chen .............................. 715/810 |
| 2005/0097135 A1* | 5/2005 | Epperson et al. .......... 707/104.1 |
| 2005/0120053 A1* | 6/2005 | Watson ...................... 707/104.1 |
| 2005/0138564 A1* | 6/2005 | Fogg ............................. 715/745 |
| 2005/0192924 A1* | 9/2005 | Drucker et al. .................. 707/1 |
| 2006/0149781 A1* | 7/2006 | Blankinship .............. 707/103 R |
| 2006/0212833 A1* | 9/2006 | Gallagher et al. ............ 715/848 |
| 2007/0083818 A1* | 4/2007 | Drucker et al. ............... 715/767 |
| 2007/0124677 A1* | 5/2007 | de los Reyes et al. ........ 715/705 |
| 2008/0184120 A1 | 7/2008 | OBrien-Strain et al. |
| 2009/0058822 A1* | 3/2009 | Chaudhri ...................... 345/173 |
| 2009/0087161 A1* | 4/2009 | Roberts et al. .................. 386/66 |
| 2009/0125812 A1 | 5/2009 | Blinnikka et al. |
| 2009/0300530 A1* | 12/2009 | Falchuk ........................ 715/764 |
| 2011/0107220 A1* | 5/2011 | Perlman ........................ 715/720 |
| 2011/0268178 A1 | 11/2011 | Park et al. |
| 2012/0039582 A1 | 2/2012 | Foo et al. |
| 2012/0042251 A1* | 2/2012 | Rodriguez .................... 715/723 |
| 2012/0170642 A1* | 7/2012 | Braness et al. ........... 375/240.01 |

OTHER PUBLICATIONS

SRCA2009.Apple iMovie on iPad Guided Tour. 2011. Retrieved on Nov. 25, 2013. Retrieved from Internet: <URL: http://www.youtube.com/watch?v=JztCEHpq7yc>.

* cited by examiner

SYSTEMS AND METHODS FOR ADAPTIVE STREAMING SYSTEMS WITH INTERACTIVE VIDEO TIMELINES

FIELD OF THE INVENTION

The present invention is directed, in general, to systems and methods for adaptive streaming systems and more specifically to systems and methods for adaptive streaming systems configured to generate interactive video timelines.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the quality of the streamed media accordingly. Streaming video over the Internet has become a phenomenon in modern times. Many popular websites, such as YouTube, a service of Google, Inc. of Mountain View, Calif., and WatchESPN, a service of ESPN of Bristol, Conn., utilize streaming video in order to provide video and television programming to consumers via the Internet.

Scalable Video Coding (SVC) is an extension of the H.264/MPEG-4 AVC video compression standard, which is specified by the ITU-T H.264 standard by the International Telecommunication Union Telecommunication Standardization Sector of Geneva, Switzerland. SVC enables the encoding of a video bitstream that additionally contains one or more sub-bitstreams. The sub-bitstreams are derived from the video bitstream by dropping packets of data from the video bitstream, resulting in a sub-bitstream of lower quality and lower bandwidth than the original video bitstream. SVC supports three forms of scaling a video bitstream into sub-bitstreams: temporal scaling, spatial scaling, and quality scaling. Each of these scaling techniques can be used individually or combined depending on the specific video system.

In adaptive streaming systems, the multimedia content is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods for adaptive streaming systems configured to generate interactive video timelines in accordance with embodiments of the invention are disclosed. In one embodiment of the invention, a method for selecting video to stream and playback using an interactive video timeline includes selecting a plurality of frames of video from a first stream of video data using a network client, displaying the plurality of frames of video in an interactive video timeline using the network client, selecting a playback frame of video data from the plurality of frames of video in the interactive video timeline using the network client, receiving a second stream of video data beginning from the playback frame of video data using the network client, and playing the second stream of video data using the network client.

In another embodiment of the invention, the first stream of video data is a stream of intra frames.

In an additional embodiment of the invention, the first stream of video data and the second stream of video data are stored in container files.

In yet another additional embodiment of the invention, the container files are Matroska container files.

In still another additional embodiment of the invention, the first stream of video data and the second stream of video data are encoded using scalable video coding.

In yet still another additional embodiment of the invention, the plurality of frames of video are displayed in a grid.

In yet another embodiment of the invention, playing the second stream of video data using the network client includes closing the interactive video timeline using the network client and playing the second stream of video data in a full screen mode using the network client.

In still another embodiment of the invention, playing the second stream of video data using the network client includes playing the second stream of video data in a window on top of the interactive video timeline using the network client.

In yet still another embodiment of the invention, playing the second stream of video data using the network client includes playing the second stream of video data in the interactive video timeline using the network client.

In yet another additional embodiment of the invention, displaying the plurality of frames of video in an interactive video timeline further includes receiving a structure file using the network client, wherein the structure file contains the structure defining the layout of the interactive video timeline, receiving the plurality of frames of video data using the network client, creating the interactive video timeline using the structure file, the plurality of frames of video data and the network client, and displaying the interactive video timeline using the network client.

In still another additional embodiment of the invention, selecting video to stream and playback using an interactive video timeline further includes displaying metadata for a plurality of frames of video in the plurality of frames of video in the interactive video timeline using the network client.

In yet still another additional embodiment of the invention, selecting a plurality of frames of video from a first stream of video data further includes selecting a first set of frames of video from the first stream of video data using the network client and displaying the plurality of frames of video in an interactive video timeline further includes displaying the first set of frames of video in an interactive video timeline using the network client.

In yet another embodiment of the invention, selecting video to stream and playback using an interactive video timeline further includes selecting a first displayed frame of video from the first set of frames of video in the interactive video timeline using the network client, selecting a second set of frames of video from the first stream of video data using the network client, and displaying the second set of frames of video in the interactive video timeline using the network client.

In still another embodiment of the invention, the frames of video in the first set of frames of video in the interactive video timeline are selected from the first stream of video data at intervals spaced by at least a first time interval and the frames of video in the second set of frames of video in the interactive video timeline are selected from the first stream of video data at intervals spaced by at least a second time interval.

In yet still another embodiment of the invention, the first time interval is greater than the second time interval.

In yet another additional embodiment of the invention, the first time interval is equal to the second time interval.

In still another additional embodiment of the invention, the first time interval is smaller than the second time interval.

Still another embodiment of the invention includes a network client, including memory configured store a client application and video data and a processor, wherein the client application configures the processor to select a plurality of frames of video from a first stream of video data, display the plurality of frames of video in an interactive video timeline, select a playback frame of video data from the plurality of frames of video in the interactive video timeline, receive a second stream of video data beginning from the playback frame of video data, and play the second stream of video data.

In yet another additional embodiment of the invention, the client application further configures the processor to receive a structure file from a media server, wherein the structure file contains the structure defining the layout of the interactive video timeline, receive the plurality of frames of video data from a media server, and create the interactive video timeline using the structure file and the plurality of frames of video data.

In still another additional embodiment of the invention, the client application further configures the processor to display an overlay for one or more frames of video in the plurality of frames of video, where the overlay includes metadata related to the one or more frames of video.

Yet another embodiment of the invention includes a machine readable medium containing processor instructions, where execution of the instructions by a processor causes the processor to perform a process including selecting a plurality of frames of video from a first stream of video data, displaying the plurality of frames of video in an interactive video timeline, selecting a playback frame of video data from the plurality of frames of video in the interactive video timeline, receiving a second stream of video data beginning from the playback frame of video data, and playing the second stream of video data.

Still another embodiment of the invention includes a media server, including a video decoder, memory configured store a server application and video data, and a processor, wherein the server application configures the processor to receive a request for an interactive video timeline, select a plurality of frames of video from a first stream of video data, render a plurality of images using the plurality of frames of video data and the video decoder, generate an interactive video timeline using the plurality of images, and transmit the interactive video timeline in response to the request for the interactive video timeline.

DETAILED DESCRIPTION

Turning now to the drawings, systems and methods for adaptive streaming systems with interactive video timelines in accordance with embodiments of the invention are disclosed. Interactive video timelines provide a user interface allowing for the efficient search and playback of video content using a variety of input methods, including touchscreens, keyboards, mice, and remote controls. In accordance with embodiments of the invention, linear interactive video timelines present a set of frames of video. Upon selecting a frame of video data, playback of the corresponding video stream (and any accompanying streams) begins from the location of the selected frame. In hierarchical interactive video timelines, a first or initial set of frames of video is displayed. In many embodiments, the frames in the first set of frames are separated by at least a first time interval. When a frame is selected from the first set of frames, a second set of frames is displayed. In a number of embodiments, the second set of frames includes frames bounded by the time interval between the time of the frames from the first set of frames following and preceding the selected frame. In addition, the frames in the second set of frames are separated by at least a second time interval. In many embodiments, the second time interval is shorter than the first time interval. The user interface can provide the option to playback the video content from point in the content corresponding to the selected frame of video data. The corresponding video stream can be played back from one of the frames, or a more granular selection of frames can again be displayed. Overlays may be displayed over the displayed frames of video. In several embodiments, overlays include a variety of information, including, but not limited to, time indicators, advertisements, prices, and/or other metadata associated with the frame of video data. In accordance with many embodiments of the invention, playback of video streams can occur in a full-screen mode, in a separate window, and/or within the interactive video timeline itself.

In a number of embodiments, interactive timelines are utilized in streaming systems. Adaptive streaming systems are configured to stream multimedia content encoded at different maximum bitrates and resolutions over a network, such as the Internet. Adaptive streaming systems stream the highest quality multimedia content, which can be supported based upon current streaming conditions. Multimedia content typically includes video and audio data, subtitles, and other related metadata. In order to provide the highest quality video experience independent of the network data rate, adaptive streaming systems are configured to switch between the available sources of video data throughout the delivery of the video data according to a variety of factors, including, but not limited to, the available network data rate and video decoder performance. In accordance with embodiments of the invention, available source of video data include alternative streams of video data encoded from source video data. When displaying a video stream, network clients in adaptive streaming systems often initialize a video decoder in order to decode and display the video stream. Systems and methods for adaptive streaming systems in accordance with embodiments of the invention are described in U.S. patent application Ser. No. 13/221,682, entitled "Systems and Methods for Adaptive Streaming of Media Stored in Matroska Container Files Using Hypertext Transfer Protocol" to Braness et al., filed Aug. 30, 2011, the disclosure of which is incorporated by reference herein in its entirety.

In accordance with embodiments of the invention, network clients in adaptive streaming systems utilize trick play streams to provide advanced playback features, including smooth visual search. Trick play streams encode multimedia content in such a way that playback of the trick play stream appears to the user to be multimedia content played back at a higher speed. For example, the trick play stream can be utilized to perform a smooth visual search as opposed to the disjointed sequence of frames experienced when visual search is performed by jumping between intra or IDR frames in one of the video streams utilized for normal playback. In accordance with embodiments of the invention, trick play streams consist of key frames from one or more of the video streams utilized for normal playback. In many embodiments, each stream of video data, including the trick play stream, is stored in a Matroska (MKV) container file. Systems and methods for using and encoding trick play streams for use in adaptive streaming systems in accordance with embodiments of the invention are disclosed in U.S. patent application Ser. No. 13/223,186, entitled "Systems and Methods for Performing Smooth Visual Search of Media Encoded for Adaptive Streaming via Hypertext Transfer Protocol using Trick Play Streams" to Braness et al., filed Aug. 31, 2011, the disclosure of which is incorporated by reference herein in its entirety. As is discussed further below, interactive timelines can be constructed using the intra or IDR frames of a video stream used for playback and/or frames of video data contained in a trick play stream. Although embodiments of the invention are described herein with respect to adaptive streaming systems, the systems and methods described are equally applicable in conventional streaming systems, including conventional streaming systems that utilize trick play tracks.

In several embodiments, interactive video timelines provide an interface for browsing streams of video data before renting or purchasing the full version of the multimedia content to which the video data belongs. For example, users can browse through selected scenes from a stream of video data and play back portions of the full media asset as a preview of the multimedia content. Systems and methods for browsing and purchasing multimedia content in accordance with embodiments of the invention are disclosed in U.S. patent application Ser. No. 13/436,900, entitled "Systems and Methods for Accessing Digital Content Using Electronic Tickets and Ticket Tokens" to Ziskind et al., filed Mar. 31, 2012, the disclosure of which is incorporated by reference herein in its entirety. Systems and methods for adaptive streaming systems with interactive video timelines in accordance with embodiments of the invention are discussed further below.

System Overview

Figure 1:
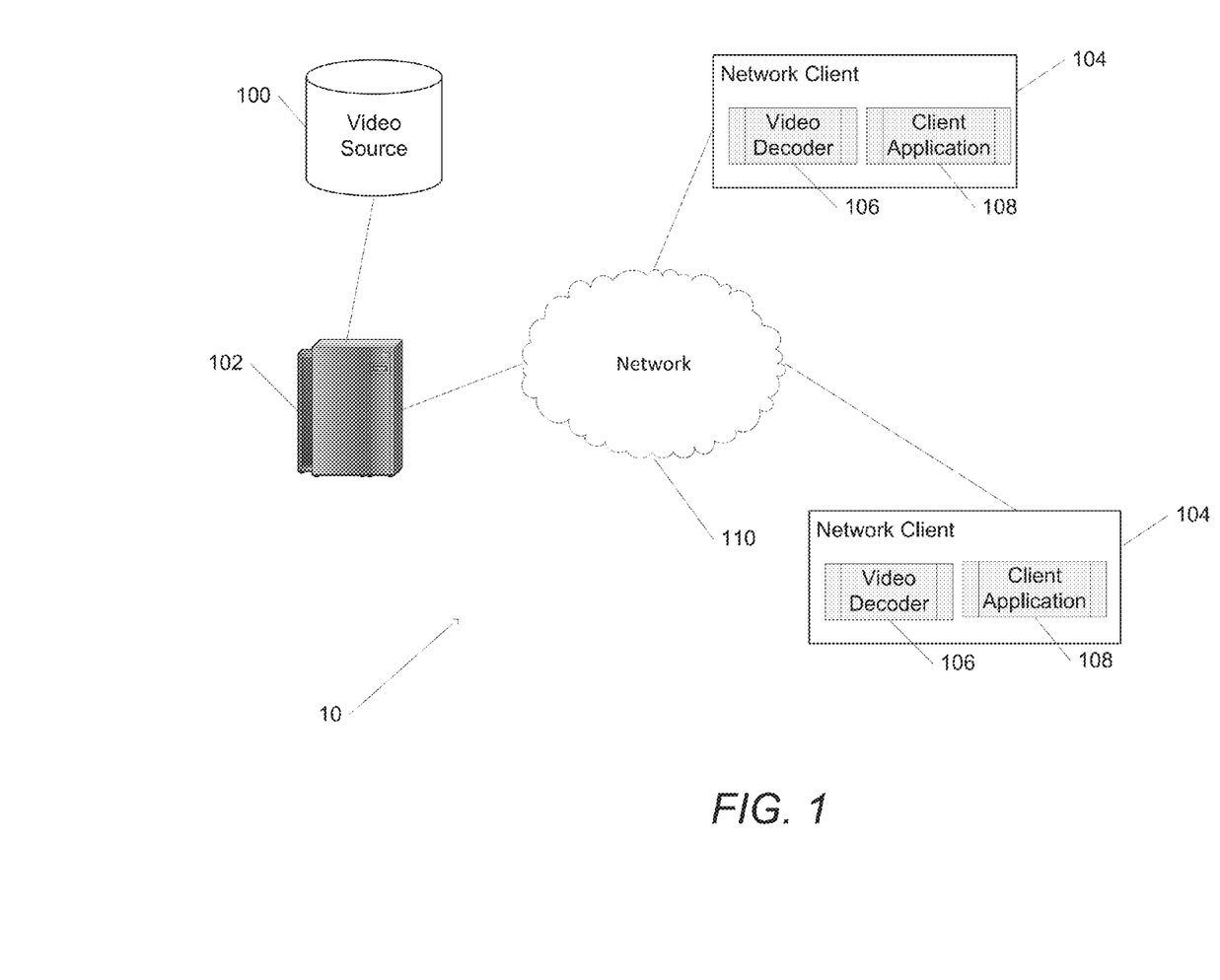
FIG. 1 is a system diagram of a system for the adaptive streaming of video data in accordance with an embodiment of the invention.

Video data networks in accordance with embodiments of the invention are configured to adapt the bitrate of the video transmitted to network clients based on streaming conditions and to enable browsing of video content using interactive video timelines. A video data network in accordance with an embodiment of the invention is illustrated in FIG. 1. The illustrated video data network 10 includes a video source 100. In a number of embodiments of the invention, the video source 100 contains pre-encoded video data encoded at multiple bitrates and resolutions for adaptive streaming. In several embodiments of the invention, the video source 100 encodes video data in real time. In many embodiments of the invention, the video source 100 contains video data encoded utilizing Scalable Video Coding (SVC). In a number of embodiments, the video source 100 contains multiple streams with equal timelines as video data. In several embodiments, the video source 100 contains trick play streams as video data. The video source 100 is connected to a network renderer 102. The network renderer 102 is connected to a plurality of network clients 104 via a network 110. The network renderer 102 is configured to stream video data to one or more network clients 104.

In many embodiments of the invention, the network renderer 102 is implemented using a single machine. In several embodiments of the invention, the network renderer 102 is implemented using a plurality of machines. In many embodiments of the invention, the network renderer 102 and the video source 100 are implemented using a media server. In many embodiments, the network 110 is the Internet. In several embodiments, the network 110 is any IP network. In a number of embodiments, the network 110 is a cellular data network.

The network clients 104 each contain a video decoder 106 and a client application 108. Network clients 104 are configured to decode video streams using the video decoder 106. In many embodiments, the network clients 104 are configured to switch between video streams based on a variety of factors, including the bandwidth and/or latency of the network connection and the performance of the video decoder 106.

In a number of embodiments, the client application 108 is configured to create and control the creation of interactive video timelines. In many embodiments, the client application 108 is configured to create interactive video timelines using frames of video from one or more video streams. In several embodiments, the client application 108 is configured to create interactive video timelines using trick play streams. In a number of embodiments, the client application 108 is configured to display interactive video timelines retrieved from a media server. In several embodiments, an interactive video timeline is created by rendering an image containing frames from one or more video streams. In a number of embodiments, an interactive video timeline is created using an interactive page containing images rendered from frames from one or more video streams. In accordance with many embodiments of the invention, the interactive page may have a structure described in, but not limited to, hypertext markup language (HTML), extensible markup language (XML), and Adobe Flash, a product of Adobe Systems of San Jose, Calif. In many embodiments, the client application 108 is configured to overlay metadata related to the frames of video incorporated in the interactive video timeline. In a number of embodiments, the client application 108 controls the playback of video streams selected using the interactive timeline using the video decoder 106.

Figure 2:
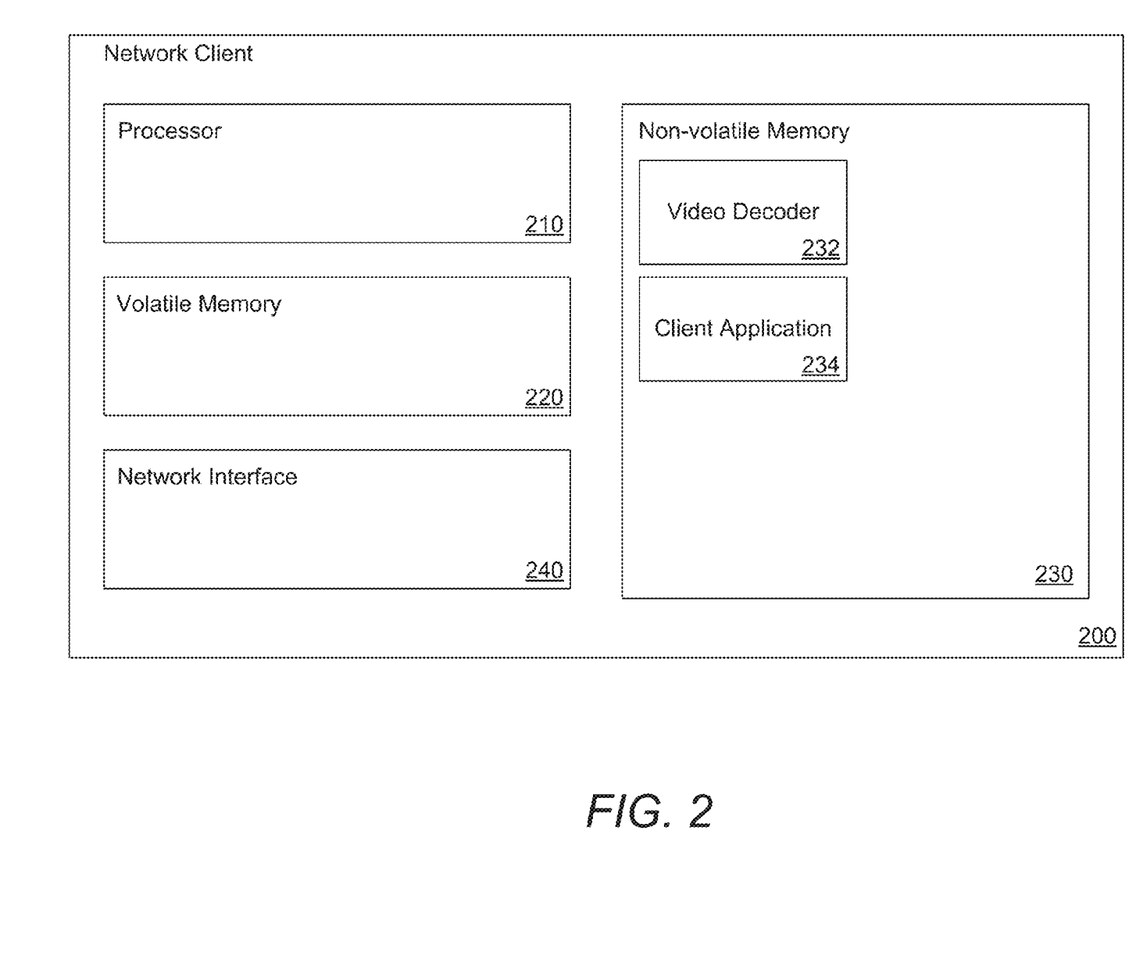
FIG. 2 conceptually illustrates a network configured to decode video data and utilize interactive video timelines in adaptive streaming systems in accordance with an embodiment of the invention.

In many embodiments of the invention, network clients can include consumer electronics devices such as DVD players, Blu-ray players, televisions, set top boxes, video game consoles, tablets, and other devices that are capable of connecting to a server and playing back encoded media. The basic architecture of a network client in accordance with an embodiment of the invention is illustrated in FIG. 2. The network client 200 includes a processor 210 in communication with non-volatile memory 230 and volatile memory 220. In the illustrated embodiment, the non-volatile memory 230 includes a video decoder 232 that configures the processor to decode scalable video data. In the illustrated embodiment, the non-volatile memory 230 further includes a client application 234 configured to create, operate, and terminate the video decoder 232 and to create, operate, and terminate interactive video timelines. In several embodiments, the video decoder 232 and/or the client application 234 are implemented using the processor 210. In a number of embodiments, the video decoder 232 and/or the client application 234 are implemented using dedicated hardware. The network client 200 also includes a network interface 240 configured to send and receive data over a network connection. In a number of embodiments, the network interface 240 is in communication with the processor 210, the non-volatile memory 230, and the volatile memory 220.

In many embodiments of the invention, the network client 200 includes multiple processors. In several embodiments, the video decoder 232 and/or the client application 234 are utilize separate processors. In a number of embodiments, the video decoder 232 and/or the client application 234 are implemented using dedicated hardware. Although a specific network client architecture is illustrated in FIG. 2, any of a variety of architectures including architectures where the video decoder is located on disk or some other form of storage, including cloud storage, and is loaded into volatile memory at runtime can be utilized to implement network clients for use in adaptive video data streaming systems with interactive video timelines in accordance with embodiments of the invention.

Although a specific architecture of a video data network that supports selection of streams using an interactive video timeline is shown in FIG. 1, other implementations appropriate to a specific application, including those which render interactive video timelines in a manner not specifically described above, can be utilized in accordance with embodiments of the invention. Processes for adaptive streaming with interactive video timelines in accordance with embodiments of the invention are discussed further below.

Linear Interactive Video Timelines

Figure 3:
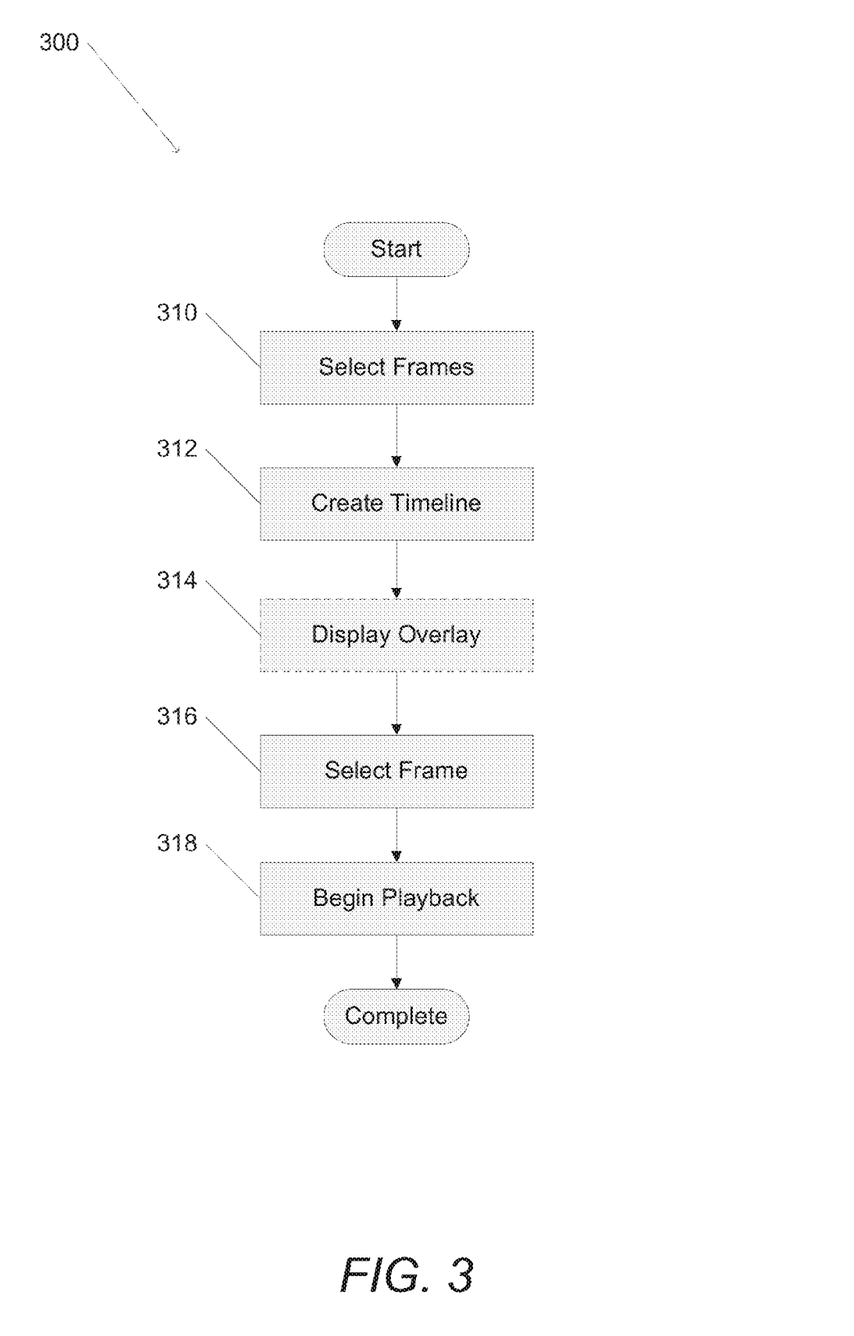
FIG. 3 is a flow chart illustrating a process for creating a linear timeline of video data for use in adaptive streaming systems in accordance with an embodiment of the invention.

When viewing streams of video data, users often wish to skip to a particular place in the stream of video data. Linear interactive video timelines allow for the quick and efficient search and navigation of streams of video data. A process for adaptive streaming using linear interactive video timelines in accordance with an embodiment of the invention is illustrated in FIG. 3. The process 300 includes selecting (310) which frames of video are to be displayed in a linear interactive video timeline. A linear interactive video timeline is created (312). In accordance with embodiments of the invention, an overlay is displayed (314) on one or more of the frames of video in the linear interactive video timeline. A frame of video is selected (316). Playback of the video stream begins (318) from the selected (316) frame of video.

In many embodiments, the frames of video that are displayed as part of the interactive video timeline are a plurality of frames of video selected from a stream of video data. In several embodiments, the frames of video are selected from a trick play stream. In a number of embodiments, the frames are an entire trick play stream.

In many embodiments of the invention, a network client selects the frames of video used to create (312) a linear interactive video timeline. In many embodiments, the network client renders images from the selected (310) frames of video, which are used to create (312) the linear interactive video timeline. In several embodiments, the selected (310) frames of video may be retrieved from a media server.

In a number of embodiments of the invention, a media server selects the frames of video used to create (312) a linear interactive video timeline. The network client can retrieve the structure of and display the linear interactive video timeline, which can be used to select content to stream to the network client. In several embodiments, the media server selects (310) frames of video and the network client receives the selected frames during the creation (312) of a linear interactive video timeline.

Figure 5:
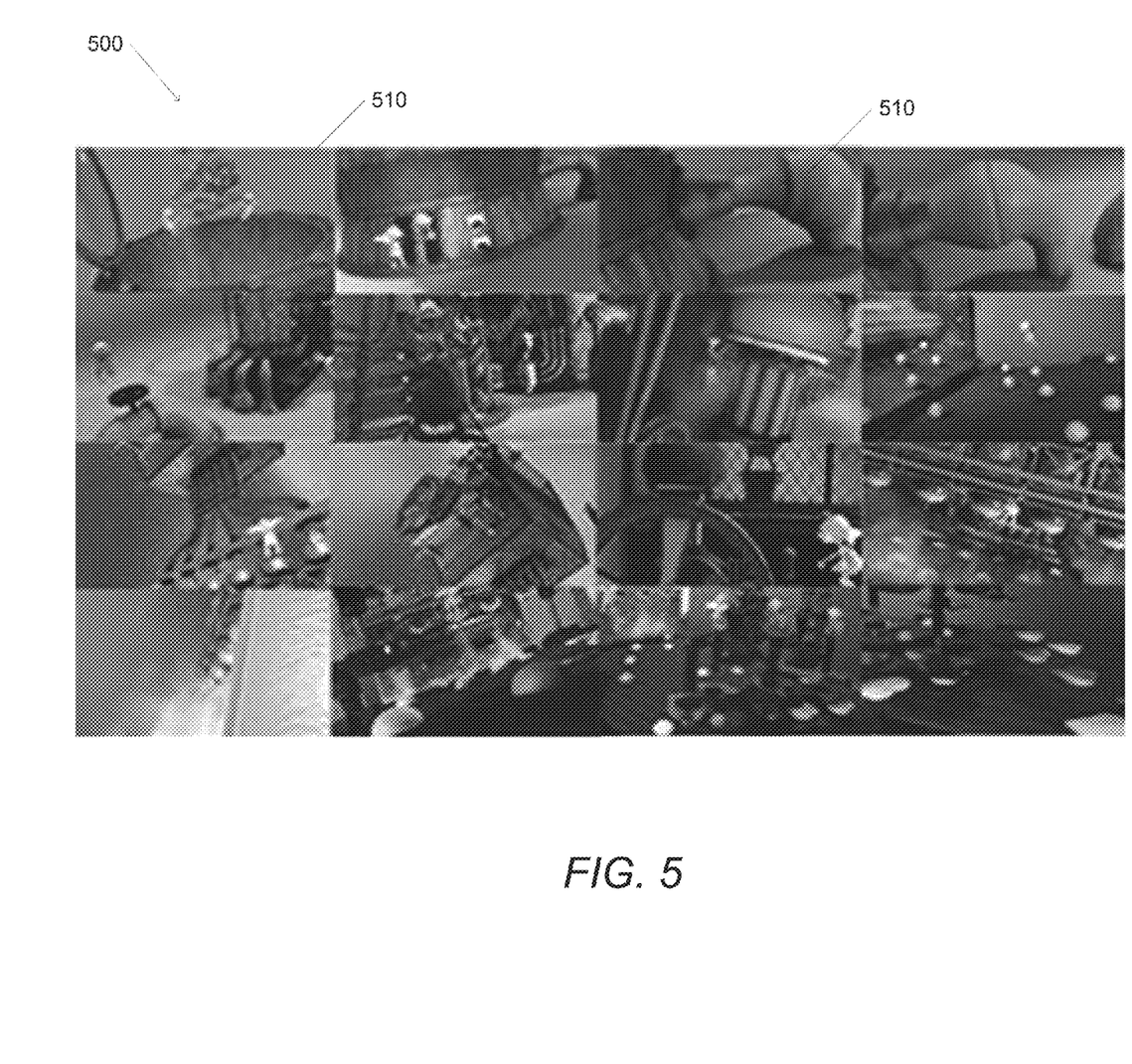
FIG. 5 is an illustration of a linear timeline of video data for use in adaptive streaming systems in accordance with an embodiment of the invention.

A linear interactive video timeline can take a variety of forms, including, but not limited to, a grid of frames of video. In many embodiments, the grid of frames of video exceeds the display size; in these embodiments, users may use a variety of interface techniques to view the entire grid of frames of video, including flipping through pages of frames of video or scrolling in a variety of directions to view the entire grid. In a number of embodiments, a still image representing the selected (310) frames is retrieved from a media server and used in the creation (312) and display of a linear interactive video timeline. An example linear interactive video timeline is illustrated in FIG. 5. The linear interactive video timeline 500 includes a plurality of frames of frames of video 510 arranged in a 4×4 grid.

Figure 6:
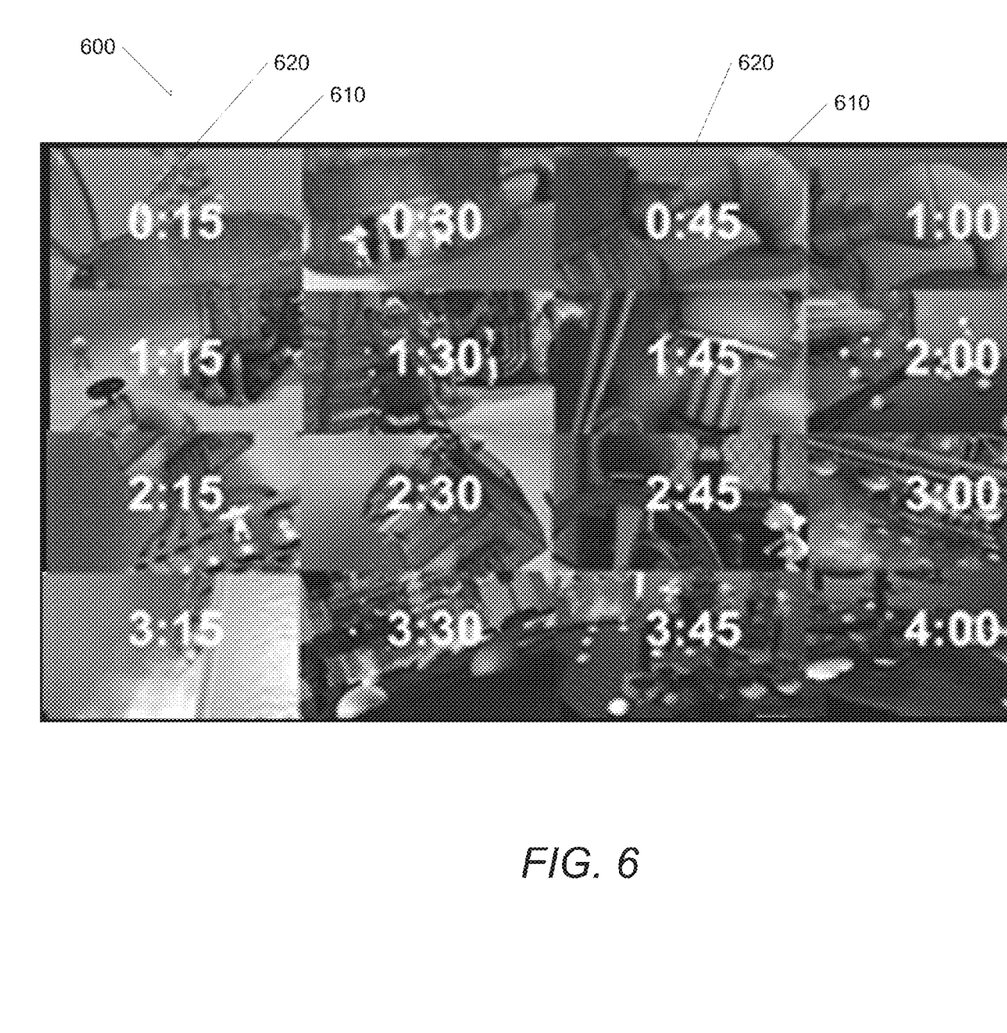
FIG. 6 is an illustration of a linear timeline of video data for use in adaptive streaming systems with an overlay in accordance with an embodiment of the invention.

The techniques utilized to display and interact with the grid of frames of video are equally applicable to those embodiments of the invention utilizing linear interactive video timelines with still images. The displayed (314) overlay includes a variety of data, including, but not limited to, the time in the video stream corresponding to the displayed frame of video. An example linear interactive video timeline with a displayed overlay is illustrated in FIG. 6. The linear interactive video timeline 600 includes a plurality of frames of video 610 arranged in a 4×4 grid, where each frame has the time of the frame of video (620) displayed on top of the frame of video. In accordance with embodiments of the invention, the metadata displayed in the overlay may be selected using a network client and/or selected using a media server and retrieved by a network client for display.

Playback of the video stream may begin (318) in a variety of ways in accordance with embodiments of the invention, including playback in a full screen mode, displacing the linear interactive video timeline, in a window displayed on top of the linear interactive video timeline, or within the linear interactive video timeline itself. In accordance with embodiments of the invention, the video stream played back may be contained on the network client and/or retrieved from a media server. In many embodiments, there is a timestamp associated with the selected (316) frame of video data; beginning (318) playback of stream of video data from the selected (316) frame of video data involves measuring the network bandwidth available for adaptive streaming and identifying the location of the selected (316) frame of video data using the measured network bandwidth to determine where in the stream of video data playback should begin (318).

Although a specific process for adaptive streaming with linear interactive video timelines is described above, a variety of processes not specifically described may be utilized in accordance with embodiments of the invention. A process for adaptive streaming with hierarchical interactive video timelines in accordance with an embodiment of the invention is discussed below.

Hierarchical Interactive Video Timelines

Figure 4:
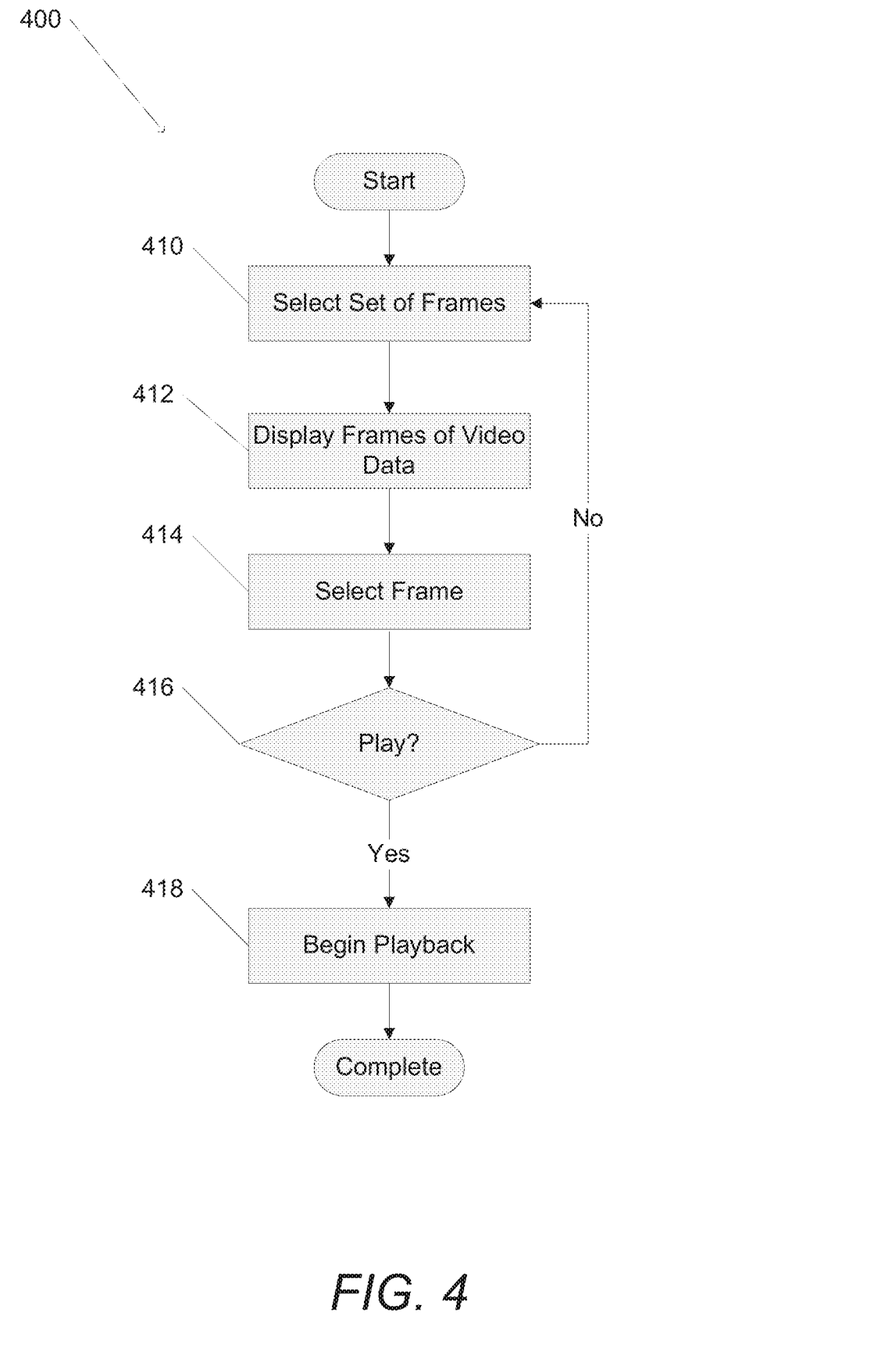
FIG. 4 is a flow chart illustrating a process for creating a hierarchical timeline of video data for use in adaptive streaming systems in accordance with an embodiment of the invention.

Hierarchical interactive video timelines allow for the browsing of video data in a rapid manner by showing a high level overview of the video data, and then progressively showing more detail depending on the portion of the video data selected. A process for adaptive streaming with hierarchical interactive video timelines in accordance with an embodiment of the invention is illustrated in FIG. 4. The process 400 includes selecting (410) a first set of frames of video from a stream of video data. The frames of video are displayed (412). A frame of video data is selected (414). The stream of video data may be played (416) beginning from the selected frame of video data, in which case playback of the video stream begins (418) from the selected frame of video data. In accordance with embodiments of the invention, the selected frame of video data from which playback begins (418) is the playback frame of video data. If the video data is not played (416), a second set of frames of video is selected (410) and the process begins again.

In accordance with embodiments of the invention, selecting (410) a first set of frames of video from stream of video data may be performed using a hierarchical index. Systems and methods for creating a hierarchical index for a stream of video data in accordance with embodiments of the invention are described in U.S. patent application Ser. No. 13/340,623, entitled "Systems and Methods for Playing Back Alternative Streams of Protected Content Protected Using Common Cryptographic Information" to Kiefer et al., filed Dec. 29, 2011, the disclosure of which is incorporated by reference herein in its entirety. In a number of embodiments, a network client creates a hierarchical index using a stream of video data in order to facilitate selecting sets of frames of video for presentation at different levels of a hierarchical interactive video timeline. In several embodiments, the hierarchical index is retrieved from a media server. When a hierarchical index is retrieved, the entire hierarchical index may be retrieved, or, in a number of embodiments, only the portion of the hierarchical index used to generate different levels of a hierarchical interactive video timeline are retrieved as a user interacts with the timeline. In accordance with embodiments of the invention, the hierarchical index may be created using one or more streams of video data contained in the multimedia content, including trick play streams. In other embodiments, the levels of the hierarchical interactive video timeline are generated using a conventional or non-hierarchical index to retrieve frames of video from a stream.

In a number of embodiments, selecting (410) a set of frames of video from a stream of video data involves selecting a subset of frames of video representing sections of the video data to be displayed (412). In many embodiments, the frames of video are frames selected from a stream of video data. In several embodiments, the frames of video are selected from a trick play stream. The displayed (412) frames of video may be selected using the network client displaying the hierarchical interactive video timeline in accordance with embodiments of the invention. In several embodiments, the displayed (412) frames of video may be retrieved from a media server, along with the structure of the hierarchical interactive video timeline. As described above with respect to FIG. 3, overlays may be displayed on the displayed (412) frames of video and the playback (418) of the video stream may occur in full screen, in a window, or within the hierarchical interactive video timeline.

In several embodiments of the invention, first frames of video in the first set of frames of video are separated by at least a first time interval and the frames of video in the second set of frames of video are separated by at least a second time interval. The first time interval may be less than, equal to, or greater than the second time interval. For example, for a 120 minute long stream of video data, the hierarchical interactive video timeline displays (412) a first set of frames of video correspond to the following time: 0 minutes, 30 minutes, 60 minutes, and 90 minutes. In this way, the first set of frames of video has a first time interval of at least 30 minutes. The frame of video data corresponding to minute 60 is selected (414). The second set of frames of video corresponding to 60, 70, 80, and 90 minutes are displayed. The second set of frames of video has a second time interval of at least 10 minutes. Playback can begin (418) from any of the displayed frames of video, or, if the 70 minute frame of video data is selected, a third set of frames of video corresponding to minutes 70, 73, 76, and 80 can be displayed (412).

A specific process for adaptive streaming with hierarchical interactive video timelines is described above; however, a variety of processes for hierarchical interactive video timelines not specifically described above, including those not specifically described by way of example, may be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. A method for selecting video to stream and playback using an interactive video timeline, comprising:
    selecting a first set of frames of video ordered based on time with at least a first time interval between each frame in the first set of frames from a first stream of video data using a network client, wherein a particular frame in the first set of frames corresponds to a first time and a frame immediately following the particular frame in the first set of frames corresponds to the first time plus the first time interval;
    displaying the first set of frames of video in an interactive video timeline using the network client;
    selecting a first frame of video from the first set of frames of video in the interactive video timeline using the network client;
    selecting a second set of frames of video from the first stream of video, the second set of frames including a new set of frames, different from the first set of frames, that are for display during playback within the first time interval following the first frame, wherein the second set of frames for display (i) begin from the selected first frame of video and (ii) end at, at a latest time associated with a last frame in the second set of frames, the frame in the first set of frames that immediately follows the first frame using the network client, wherein frames within the second set of frames of video are separated by a second time interval between each frame in the second set of frames that is less than the first time interval between frames in the first set of frames; and
    displaying the second set of frames of video in the interactive video timeline using the network client.

2. The method of claim 1, wherein the first stream of video data is a stream of intra frames.

3. The method of claim 1, wherein the first stream of video data is stored in one or more container files.

4. The method of claim 3, wherein the container files are Matroska container files.

5. The method of claim 1, wherein the first stream of video data is encoded using scalable video coding.

6. The method of claim 1, wherein the first set of frames of video are displayed in a grid.

7. The method of claim 1, further comprising:
receiving a second stream of video data beginning from the first frame of video data using the network client; and
playing the second stream of video data using the network client, wherein
playing the second stream of video data using the network client comprises:
closing the interactive video timeline using the network client; and
playing the second stream of video data in a full screen mode using the network client.

8. The method of claim 7, wherein playing the second stream of video data using the network client comprises playing the second stream of video data in a window on top of the interactive video timeline using the network client.

9. The method of claim 7, wherein playing the second stream of video data using the network client comprises playing the second stream of video data in the interactive video timeline using the network client.

10. The method of claim 1, wherein displaying the first set of frames of video in an interactive video timeline further comprises:
receiving a structure file using the network client, wherein the structure file contains the structure defining the layout of the interactive video timeline;
receiving the first stream of video data using the network client;
creating the interactive video timeline using the structure file, the first stream of video data; and the network client; and
displaying the interactive video timeline using the network client.

11. The method of claim 1, further comprising displaying metadata for a plurality of frames of video in the first set of frames of video in the interactive video timeline using the network client.

12. A network client, comprising:
memory configured store a client application and video data; and
a processor;
wherein the client application configures the processor to:
select a first set of frames of video ordered based on time with at least a first time interval between each frame in the first set of frames from a first stream of video data, wherein a particular frame in the first set of frames corresponds to a first time and a frame immediately following the particular frame in the first set of frames corresponds to the first time plus the first time interval;
display the first set of frames of video in an interactive video timeline;
select a first frame of video from the first set of frames of video in the interactive video timeline;
select a second set of frames of video from the first stream of video, the second set of frames including a new set of frames, different from the first set of frames, that are for display during playback within the first time interval following the first frame, wherein the second set of frames for display (i) begin from the selected first frame of video and (ii) end at, at a latest time associated with a last frame in the second set of frames, the frame in the first set of frames that immediately follows the first frame, wherein frames within the second set of frames of video are separated by a second time interval between each frame in the second set of frames that is less than the first time interval between frames in the first set of frames; and
display the second set of frames of video in the interactive video timeline.

13. The network client of claim 12, wherein the client application further configures the processor to:
receive a structure file from a media server, wherein the structure file contains the structure defining the layout of the interactive video timeline;
receive the first set of frames of video from a media server; and
create the interactive video timeline using the structure file and the first set of frames of video.

14. The network client of claim 12, wherein the client application further configures the processor to display an overlay for one or more frames of video in the first set of frames of video, where the overlay comprises metadata related to the one or more frames of video.

15. A non-transitory machine readable medium containing processor instructions, where execution of the instructions by a processor causes the processor to perform a process comprising:
selecting a first set of frames of video ordered based on time with at least a first time interval between each frame in the first set of frames from a first stream of video data, wherein a particular frame in the first set of frames corresponds to a first time and a frame immediately following the particular frame in the first set of frames corresponds to the first time plus the first time interval;
displaying the first set of frames of video in an interactive video timeline;
selecting a first frame of video from the first set of frames of video in the interactive video timeline;
selecting a second set of frames of video from the first stream of video, the second set of frames including a new set of frames, different from the first set of frames, that are for display during playback within the first time interval following the first frame, wherein the second set of frames for display (i) begin from the selected first frame of video and (ii) end at, at a latest time associated with a last frame in the second set of frames, the frame in the first set of frames that immediately follows the first frame, wherein frames within the second set of frames of video are separated by a second time interval between each frame in the second set of frames that is less than the first time interval between frames in the first set of frames; and
displaying the second set of frames of video in the interactive video timeline.

16. A media server, comprising:
a video decoder;
memory configured store a server application and video data; and
a processor;
wherein the server application configures the processor to:
receive a first request for an interactive video timeline;
select a first set of frames of video ordered based on time with at least a first time interval between each frame in the first set of frames from a first stream of video data, wherein a particular frame in the first set of frames corresponds to a first time and a frame immediately following the first frame in the first set of frames corresponds to the first time plus the first time interval;

generate an interactive video timeline using the first set of frames and the video decoder;

transmit the interactive video timeline in response to the request for the interactive video timeline;

receive a selection of a first frame from the first set of frames;

select a second set of frames of video from the first stream of video, the second set of frames including a new set of frames, different from the first set of frames, that are for display during playback within the first time interval following the first frame, wherein the second set of frames for display (i) begin from the selected first frame of video and (ii) end at, at a latest time associated with a last frame in the second set of frames, the frame in the first set of frames that immediately follows the first frame, wherein frames within the second set of frames of video are separated by a second time interval between each frame in the second set of frames that is less than the first time interval between frames in the first set of frames;

re-generate the interactive video timeline using the second set of frames and the video decoder; and transmit the interactive video timeline in response to the selection of the first frame.

\* \* \* \* \*